United States Patent [19]
Ohno et al.

[11] Patent Number: 5,560,964
[45] Date of Patent: Oct. 1, 1996

[54] MINUTE-PARTICLE IRON OXIDE RED PIGMENT SLURRY AND METHOD OF MANUFACTURING THE SAME

[75] Inventors: Katsutoshi Ohno, Tokyo; Tsuneo Kusunoki, Kanagawa; Kenichi Ozawa, Kanagawa; Kenji Takayanagi, Kanagawa; Shigeo Sasaki; Akira Nishio, both of Saitama, all of Japan

[73] Assignees: Sony Corporation; Dainichiseika Color & Chemicals Mfg. Co., Ltd., both of Tokyo, Japan

[21] Appl. No.: 457,455

[22] Filed: Jun. 1, 1995

[30] Foreign Application Priority Data

Jun. 6, 1994 [JP] Japan .................................. 6-123938

[51] Int. Cl.⁶ .............................. G02B 5/22; G09C 1/24
[52] U.S. Cl. ..................... 427/510; 106/457; 359/885
[58] Field of Search ............................ 106/457; 359/885; 427/510

[56] References Cited

U.S. PATENT DOCUMENTS 4,299,635  1/1981  Dickerson ..................... 106/457

FOREIGN PATENT DOCUMENTS 54749       3/1967  German Dem. Rep. ............... 106/457
63-146946   6/1988  Japan ........................................ 106/457

OTHER PUBLICATIONS

Derwent WPI Abstract 78-35549A/20 and JP 530036538 A (Toda Kogyo) (Apr. 1988).

Derwent WPI Abstract 75-01128W/01 and SU 000418506(PESHEKHONOVA) (Jul. 1974).

*Primary Examiner*—David Brunsman
*Attorney, Agent, or Firm*—Hill, Steadman & Simpson

[57]  ABSTRACT

A minute-particle iron oxide red pigment slurry is formed by adding sodium silicate to a minute-particle iron oxide red pigment slurry, and used to form a red filter formed between a phosphor layer of a color cathode ray tube and a panel thereof. Therefore, even if the red filter is brought in contact with a black matrix under the condition of a process of manufacturing the color cathode ray tube at high temperature, the red filter does not discolor the black matrix.

8 Claims, 1 Drawing Sheet

MINUTE-PARTICLE IRON OXIDE RED PIGMENT SLURRY AND METHOD OF MANUFACTURING THE SAME

BACKGROUND OF THE INVENTION

1. Field of the Invention

The present invention relates to a minute-particle iron oxide red pigment slurry used to improve a contrast of a red phosphor layer on a picture screen of a color cathode ray tube, and a manufacturing method thereof.

2. Description of the Related Art

It is known that a pigmented phosphor layer is used to improve a contrast of a picture screen of a color cathode ray tube. In this case, there is used a pigment which has high reflectance to light having the same wavelength as that of emission spectrum of a main light emitting region of the phosphor layer and low reflectance to light having the same wavelength as that of emission spectrum of the other region. Therefore, even if light component having a wavelength which is different from that of the emission spectrum of the main light emitting region of the phosphor layer, the light component is absorbed by the pigment in the phosphor layer. Thus, it is possible to obtain a color cathode ray tube having high contrast even under bright external light. In general, a pigment made of red iron oxide is adhered to the red phosphor layer.

However, it is sometimes observed that a luminance of light emitted from the phosphor layer is lowered depending upon a size of a pigment particle adhered onto the phosphor layer or thickness of a pigment particle layer. Therefore, it is required to uniformly adhere the pigment layer onto a surface of the phosphor layer. However, it is very difficult. There is then the disadvantage that the pigment layer which is once adhered onto the phosphor layer is detached therefrom during a process of coating the phosphor layer on the cathode ray tube.

Accordingly, it is not proper that the pigmented phosphor layer is used in the color cathode ray tube in order to improve the contrast of the picture screen of the cathode ray tube.

On the other hand, it is known that red, green and blue light transmitting thin films, i.e., color filters respectively corresponding to red, green and blue phosphor regions are provided between the phosphor layer and a panel in order to improve the contrast of the picture screen of the cathode ray tube.

It is sufficient to provide the red filter having high transmittance between the red phosphor layer and the panel. However, under the condition of the color cathode ray tube manufacturing process which requires heat resistance to high temperature, e.g., 450° C, it is impossible to use a red dye and a red organic pigment as a material used to form the red filter. Optimum pigments that can be used in the red filter include a minute-particle iron oxide red pigment, i.e., an iron oxide pigment which is generally called a transparent iron oxide pigment.

Such red filter is obtained by coating a pigment slurry in which a minute-particle iron oxide is highly dispersed on the panel of the color cathode ray tube. Since a red iron oxide does not transmit therethrough ultra-violet rays, it is impossible to cure a pigment slurry coated layer by poly(vinyl alcohol) (hereinafter referred to as PVA)—ammonium dichromate (hereinafter referred to as ADC) method. Therefore, a method using periodic acid is employed.

According to the PVA-ADC method, a pigment slurry added with a mixed solution of PVA and ADC is coated on an entire surface of the panel and a portion where a phosphor having a predetermined emission spectrum and a black matrix are to be formed is exposed to light through a shadow mask or an aperture grill. Then, there are removed a ADC film and a pigment slurry on a portion where phosphors having emission spectra other than the predetermined emission spectrum are to be formed.

According to the method using periodic acid, the mixed solution of PVA and ADC is coated on the entire of the panel and a portion where a phosphor having emission spectra other than a predetermined emission spectrum is to be formed is exposed to light through a shadow mask or an aperture grill. Then, the panel is developed with water and a PVA film is formed on a portion where phosphors having emission spectra other than the predetermined emission spectrum are to be formed. Therefore, a pigment slurry is coated on the entire surface of the panel and dried. Then, the PVA film is broken by using periodic acid and the panel is washed with water to remove the PVA film and the pigment slurry on the portion where the phosphors having the emission spectra other than the predetermined color is to be formed.

In the general process of manufacturing the color cathode ray tube, the red filter is formed on the black matrix. Under the condition of the cathode ray tube manufacturing process which requires heat resistance to high temperature, e.g., 450° C, when carbon black composing the black matrix and iron oxide which is a component of the red filter are brought in contact with each other, there is then the possibility that the black matrix is discolored by an interaction of an oxidizing power of iron oxide and a reducing power of carbon black. Improvement in discoloration of the black matrix is demanded.

SUMMARY OF THE INVENTION

A first object of the present invention is to provide a minute-particle iron oxide red pigment slurry which, even when a red filter formed between a phosphor layer of a color cathode ray tube and a panel thereof is brought in contact with a black matrix under the condition of a color-cathode-ray-tube manufacturing process requiring heat resistance to high temperature, hardly discolors the black matrix, and a manufacturing method by which such minute-particle iron oxide red pigment slurry can be obtained.

A second object of the present invention is to provide a method of forming a red filter which uses the minute-particle iron oxide red pigment slurry and hardly discolors the black matrix.

The minute-particle iron oxide red pigment slurry according to the present invention is made by adding a sodium silicate to a minute-particle iron oxide red pigment dispersed slurry.

In the method of manufacturing the minute-particle iron oxide red pigment slurry according to the present invention, the minute-particle iron oxide red pigment slurry is added with the sodium silicate and then subjected to a wet dispersion treatment. Alternatively, the minute-particle iron oxide red pigment slurry is subjected to the wet dispersion treatment and then added with sodium silicate.

The sodium silicate used in the method of manufacturing the minute-particle iron oxide red pigment slurry according to the present invention is preferably a sodium silicate No. 3.

An addition amount of sodium silicate No. 3 used in the method of manufacturing the minute-particle iron oxide red pigment slurry according to the present invention is preferably within the range of from 1 weight % to 30 weight % relative to an iron oxide pigment.

According to the red-filter forming method of the present invention, a mixed solution of PVA and ADC is coated on an entire surface of a panel on which the black matrix is previously formed in a predetermined pattern. A portion of the panel where green and blue phosphors are to be formed is exposed to ultra-violet rays through a shadow mask or an aperture grill to form a PVA film thereon. The minute-particle iron oxide red pigment slurry added with the sodium silicate is coated on the entire surface of the panel and dried. Bridge bonds of the PVA film at the portion where the green and blue phosphors are to be formed are broken by a treating agent. Then, the panel is developed by using water and the red filter is formed on the portion of the panel where a red phosphor is to be formed, and on the black matrix.

Since the minute-particle iron oxide red pigment slurry according to the present invention is made by adding the sodium silicate to the minute-particle iron oxide red pigment slurry, even if the red filter formed between the phosphor layer of the color cathode ray tube and the panel thereof is brought in contact with the black matrix under the condition of the color-cathode-ray-tube manufacturing method requiring heat resistance to high temperature, the red filter hardly discolors the black matrix.

DESCRIPTION OF THE PREFERRED EMBODIMENTS

Figure 1:
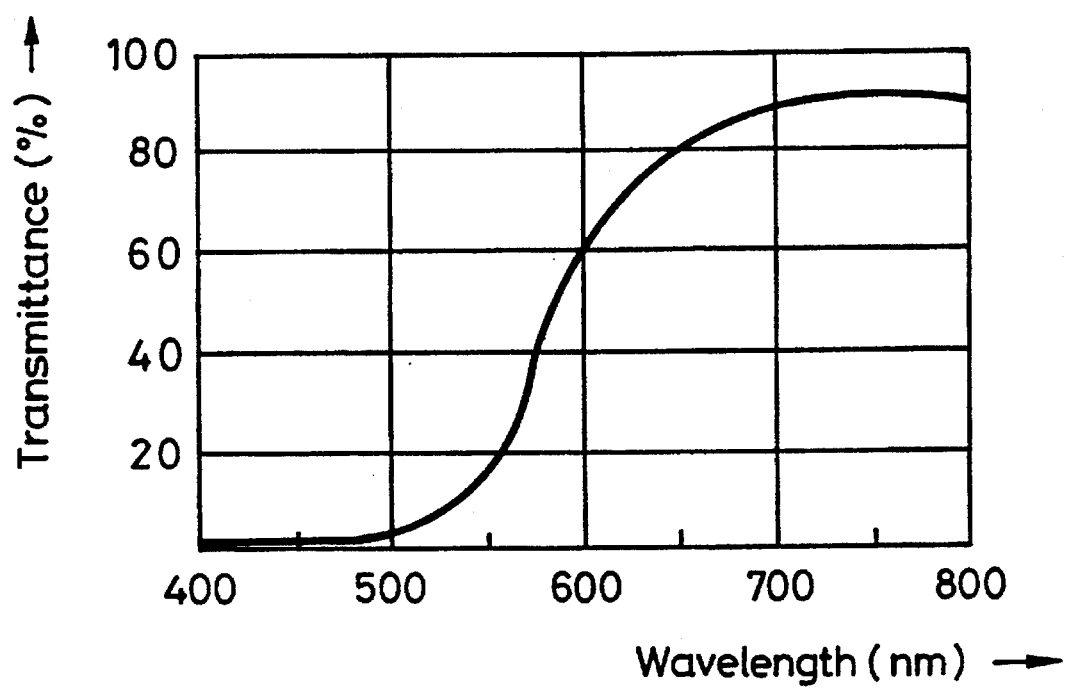
FIG. 1 is a graph showing a characteristic curve indicating a spectral transmittance characteristics of an iron oxide red pigment according to the present invention.

A preferred embodiment of the present invention will hereinafter be described. A minute-particle iron oxide red pigment slurry according to the present invention is made by adding a sodium silicate to a minute-particle iron oxide red pigment dispersed slurry, whereby even when a red filter formed between a phosphor layer of a color cathode ray tube and a panel thereof is brought in contact with a black matrix under the condition of a color-cathode-ray-tube manufacturing process requiring heat resistance to high temperature, the red filter hardly discolors the black matrix.

A molecular formula of the sodium silicate is generally represented by $Na_2O.nSiO_2$ where n represents a mole ratio obtained by (a weight ratio of $SiO_2/Na_2O) \times 1.032$. Sodium silicate having a mole ratio within the range of n=0.5 to 4 is industrially produced at present.

Crystalline sodium silicate includes the following sodium silicates:

sodium orthosilicate ($2Na_2O.SiO_2.xH_2O$) with a mole ratio of 0.5;

sodium sesquisilicate ($3Na_2O.2SiO_2.xH_2O$) with a mole ratio of 0.6 7; and sodium metasilicate ($Na_2O.SiO_2.xH_2O$) with a mole ratio 1.

Sodium silicate solutions include the following sodium silicate solutions:

sodium silicate No. 1 ($Na_2O.2SiO_2$.aq) with a mole ratio of 2;

sodium silicate No. 2 ($2Na_2O.5SiO_2$.aq) with a mole ratio of 2.5;

sodium silicate No. 3 ($Na_2O.3SiO_2$.aq) with a mole ratio of 3; and sodium silicate No. 4 ($Na_2O.4SiO_2$.aq) with a mole ratio of 4.

Sodium silicate No. 1, sodium silicate No. 2, sodium silicate No. 3 and sodium metasilicate are prescribed by Japanese Industrial Standard as follows (in JIS K1408-1966).

TABLE 1

| sodium silicate No. 1 | | |
| --- | --- | --- |
| appearance | | viscous, colorless or slightly colored liquid |
| specific gravity (15° C. B'e) | | — |
| composition | silicone dioxide ($SiO_2$) (weight %) | 35 to 38 |
| | sodium oxide ($Na_2O$) (weight %) | 17 to 19 |
| | iron (Fe) (weight %) | 0.03 or smaller |
| | water-insoluble matter (weight %) | 0.2 or smaller |

TABLE 2

| sodium silicate No. 2 | | |
| --- | --- | --- |
| appearance | | viscous, colorless or slightly colored liquid |
| specific gravity (15° C. B'e) | | 54 or greater |
| composition | silicone dioxide ($SiO_2$) (weight %) | 34 to 36 |
| | sodium oxide ($Na_2O$) (weight %) | 14 to 15 |
| | iron (Fe) (weight %) | 0.03 or smaller |
| | water-insoluble matter (weight %) | 0.2 or smaller |

TABLE 3

| sodium silicate No. 3 | | |
| --- | --- | --- |
| appearance | | viscous, colorless or slightly colored liquid |
| specific gravity (15° C. B'e) | | 40 or greater |
| composition | silicone dioxide ($SiO_2$) (weight %) | 28 to 30 |
| | sodium oxide ($Na_2O$) (weight %) | 9 to 10 |
| | iron (Fe) (weight %) | 0.02 or smaller |
| | water-insoluble matter (weight %) | 0.2 or smaller |

TABLE 4

| sodium metasilicate of first kind (salt pentahydrate) | | |
| --- | --- | --- |
| appearance | | white powder or granulated matter |
| specific gravity (15° C. B'e) | | — |
| composition | silicone dioxide ($SiO_2$) (weight %) | 27.5 to 29 |
| | sodium oxide ($Na_2O$) (weight %) | 28.5 to 30 |
| | iron (Fe) (weight %) | — |
| | water-insoluble matter (weight %) | — |

TABLE 5

| sodium metasilicate of second kind (salt nonahydrate) | | |
| --- | --- | --- |
| appearance | | white crystal |
| specific gravity (15° C. B'e) | | — |
| composition | silicone dioxide (SiO$_2$) (weight %) | 19 to 22 |
| | sodium oxide (Na$_2$O) (weight %) | 20 to 22 |
| | iron (Fe) (weight %) | — |
| | water-insoluble matter (weight %) | — |

If it is considered that sodium silicate added to a minute-particle iron oxide red pigment dispersed slurry should have low sodium and should be hydrolyzed easily, then sodium silicate No. 3 is preferable.

If a ratio of added sodium silicate No. 3 to a pigment in the minute-particle iron oxide red pigment slurry is within the range of from 1.0 weight % to 30.0 weight % relative to the minute-particle iron oxide red pigment slurry of 100 weight %, then there can be achieved a high effect of preventing a black matrix from being discolored. Moreover, there is no disadvantage that the minute-particle red iron oxide pigments cohere and alkalinity of the minute-particle red iron oxide pigment slurry is increased.

Particularly, if the ratio of the added sodium silicate No. 3 to the pigment of the minute-particle iron oxide red pigment slurry is within the range of from 5.0 weight % to 20.0 weight % relative to the minute-particle iron oxide red pigment slurry of 100 weight %, then there can be achieved a higher effect of preventing the black matrix from being discolored. Moreover, there is absolutely no disadvantage that the minute-particle red iron oxide pigments cohere and the alkalinity of the minute-particle red iron oxide pigment slurry is increased.

However, if the ratio of the added sodium silicate No. 3 to the pigment of the minute-particle iron oxide red pigment slurry is 1.0 weight % or smaller, then the effect of preventing the black matrix from being discolored is lowered. If the ratio of the added sodium silicate No. 3 to the pigment of the minute-particle iron oxide red pigment slurry exceeds 30 weight %, then the minute-particle red iron oxide pigments cohere and the alkalinity of the minute-particle red iron oxide pigment slurry is increased. Therefore, a satisfactory cathode ray tube is prevented from being manufactured.

The sodium silicate No. 3 may be added to the minute-particle iron oxide red pigment slurry after the minute-particle iron oxide red pigment is sufficiently dispersed in a dispersion medium or at a time when various materials are mixed before the minute-particle iron oxide pigment is dispersed therein. In view of achievement of sufficient dispersion of the sodium silicate No. 3 in the minute-particle iron oxide red pigment slurry, it is preferable to add the sodium silicate No. 3 to the minute-particle iron oxide red pigment slurry after the minute-particle iron oxide red pigment is sufficiently dispersed in the dispersion medium.

The red pigment slurry according to this embodiment is formed of the minute-particle iron oxide red pigment. In order to increase light transmittance of the red pigment slurry obtained after the minute-particle iron oxide red pigment is dispersed therein, it is preferable that a minute-particle iron oxide has a small particle size. If the particle size or diameter of the minute-particle iron oxide becomes half of a main wavelength of red light or smaller, i.e., 0.3 μm or smaller, then the light transmittance obtained after of the minute-particle red iron oxide pigment slurry is dispersed is increased. In consideration of a refractive index of the iron oxide, it is preferable to set the particle size of the minute-particle iron oxide to 0.1 μm or smaller. In order to further increase the light transmittance of the slurry obtained after the minute-particle iron oxide red pigment is dispersed, it is preferable for the minute-particle iron oxide to be needle-shaped rather than globular.

However, if the particle size of the minute-particle iron oxide is too small, then dispersion of the minute-particle iron oxide becomes difficult to thereby lower the light transmittance of the slurry obtained after the dispersion. Accordingly, to summarize the above description, in order to increase the light transmittance of the minute-particle iron oxide red pigment slurry obtained after the minute-particle iron oxide red pigment is dispersed, an optimum particle size of the minute-particle iron oxide red pigment is substantially within the range of from 0.05 μm to 0.1 μm. As long as the light transmittance obtained after the dispersion of the minute-particle iron oxide red pigment, and color purity is high, any kind of minute-particle iron oxide red pigment may be used.

In view of high purity of hue and high light transmittance, it is especially satisfactory to use the needle-shaped red iron oxide having the particle size with a major axis of the substantial range of from 0.05 μm to 0.1 μm and a minor axis of about 0.01 μm, i.e., $\alpha Fe_2O_3$.

The minute-particle iron oxide red pigment is dispersed by wet dispersing method employing a suitable device such as a ball mill, a sand mill or the like.

Subsequently, a specific inventive example and a specific comparative example of the minute-particle iron oxide red pigment slurry will be described to compare effects thereof.

Inventive Example

The minute-particle iron oxide red pigment (transparent iron oxide) of 500 parts by weight and deionized water of 1500 parts by weight were put in a ball mill and dispersed for forty minutes to obtain a slurry of 1900 parts by weight which contains the pigment of 25 weight %. A part of this slurry was used to measure a particle size thereof by a centrifugal sedimentation particle-size distribution measuring apparatus. The measurement revealed that a mean particle size was 0.04 μm and the obtained slurry has no large particle.

Subsequently, sodium silicate No. 3 solution of 79.2 parts by weight (which contains SiO$_2$ of 30 weight %) was prepared. The above amount corresponds to an amount of 5 weight relative to the pigment in the slurry which contains the pigment of 25 weight %. Further, deionized water of 395.8 parts by weight was prepared. The deionized water of 395.8 parts by weight and the sodium silicate No. 3 solution of 79.2 parts by weight were added to the pigment slurry of 1900 parts by weight and stirred for one hour to obtain a uniform slurry of 2375 parts by weight. The slurry contains the pigment of 20 weight % and sodium silicate No. 3 of 5 weight % relative to the pigment as SiO$_2$.

When the slurry was used to manufacture a red color filter of a color cathode ray tube, there could be obtained the red color filter which had an excellent purity of red and an excellent light transmittance and did not discolor a black matrix.

Comparative Example

A red color filter of the color cathode ray tube was manufactured by using a minute-particle iron oxide red pigment slurry which was similar to that of inventive example except that sodium silicate No. 3 was not added thereto. Although the manufactured red filter had an excellent purity of red and an excellent light transmittance, it discolored the black matrix.

Subsequently, a method of manufacturing the red filter will be described. Since a spectral transmission characteristic graph of the iron oxide red pigment shown in FIG. 1 clearly reveals that the iron oxide red pigment does not transmit ultra-violet rays, it is impossible to employ a method of exposing to ultra-violet rays the slurry in which PVA and ADC are added to the iron oxide red pigment coated on a panel.

Therefore, the following method is employed. A mixed solution of PVA and ADC is coated on an entire surface of the panel of the color cathode ray tube on which the black matrix is previously formed in a predetermined pattern. A portion of the coated film of solution where a green phosphor and a blue phosphor are to be formed is exposed to ultra-violet rays through a shadow mask, and then developed by using water. Thus, a PVA film is formed at a portion where the green phosphor and the blue phosphor are to be formed.

A pigment slurry obtained by dispersing the red iron oxide pigment and a dispersing agent in water is coated on the entire surface of the panel while a thickness of the coated slurry is adjusted by rotation number of a coating machine so that a desired light transmittance should be obtained. Thereafter, the pigment slurry is dried by an infrared ray heater.

Then, in order to remove the PVA film on the portion where the green phosphor layer and the blue phosphor layer are to be formed, the panel of the color cathode ray tube is turned upward and a 9% hydrogen peroxide solution is poured thereinto and the panel is left for one or two minutes.

With this treatment, a water-insoluble portion produced by crosslinking PVA and ADC by exposure to ultra-violet rays is destroyed and becomes water-soluble. Then, when the panel is washed with water, the PVA film is removed and the iron oxide red pigment adhered to the PVA film is also removed. Accordingly, a filter film made of the red pigment is formed only on a portion of the panel where a red phosphor is to be coated, and on the black matrix. Then, the phosphor layer is formed on the panel.

When the above-mentioned minute-particle iron oxide red pigment slurry is used to form the red filter formed between the phosphor layer of the color cathode ray tube and the panel thereof, it is possible to obtain the red filter which does not discolors the black matrix even if the red filter is brought in contact with the black matrix under the condition of the color-cathode-ray-tube manufacturing process requiring heat resistance to high temperature. The reason of the effect of preventing the black matrix from being discolored is not certain but may be that silica ($SiO_2$) is produced on a surface of iron oxide or a boundary surface between iron oxide and a carbon black by hydrolyzing the sodium silicate, thereby preventing the iron oxide and the carbon black from being in contact with each other.

Subsequently, a method of forming the phosphor layer will be described. There are the following three general methods of forming the phosphor layer: a slurry method in which a slurry made of a phosphor, a photosensitive resin and so on is coated on a panel by rotary coating method and cured by exposure to ultra-violet rays through a shadow mask or an aperture grill; a printing method in which a print paste made of a phosphor, ethyl cellulose and so on is prepared and then printed on a panel by screen printing; and an electrodeposition method in which a phosphor is dispersed in an electrodeposition solution and deposited on a panel by electrodeposition.

When the phosphor is coated on the panel in a dotted fashion or a striped fashion to form the phosphor layer, the slurry method is used generally. Specifically, the slurry made of phosphor, PVA, ADC and so on is coated on the entire surface of the panel while the panel is rotated. The coated slurry is exposed to ultra-violet rays through the shadow mask or the aperture grill. Then, the exposed slurry is developed with water to obtain the phosphor layer formed in a dotted fashion or a striped fashion.

Since the minute-particle iron oxide red pigment slurry according to the present invention is made by adding the sodium silicate to the minute-particle iron oxide red pigment dispersed slurry, even if the red filter formed between the phosphor layer of the color cathode ray tube and the panel thereof is brought in contact with the black matrix under the condition of the color-cathode-ray-tube manufacturing method requiring heat resistance to high temperature, the red filter hardly discolors the black matrix.

In the method of manufacturing the minute-particle iron oxide red pigment slurry according to the present invention, the minute-particle iron oxide red pigment slurry is added with sodium silicate and then subjected to a wet dispersion treatment. Alternatively, the minute-particle iron oxide red pigment slurry is subjected to a wet dispersion treatment and then added with sodium silicate. Therefore, it is possible to obtain the minute-particle iron oxide red pigment slurry which hardly discolors the black matrix even if the red filter formed between the phosphor layer of the color cathode ray tube and the panel thereof is brought in contact with the black matrix under the condition of the color-cathode-ray-tube manufacturing method requiring heat resistance to high temperature. However, in view of achievement of sufficient dispersion of the sodium silicate in the minute-particle iron oxide red pigment slurry, it is preferable to add the sodium silicate to the minute-particle iron oxide red pigment slurry after the minute-particle iron oxide red pigment is dispersed in the dispersion medium.

When the sodium silicate used in the method of manufacturing the minute-particle iron oxide red pigment slurry according to the present invention is particularly the sodium silicate No. 3, there is the advantage that the sodium silicate No. 3 has low sodium and is hydrolyzed easily.

An addition amount of sodium silicate No. 3 used in the method of manufacturing the minute-particle iron oxide red pigment slurry according to the present invention is preferably set within the range of from 1 weight % to 30 weight % relative to the iron oxide pigment. Therefore, high effect of preventing the black mask from being discolored can be achieved. Moreover, such setting is preferable since there is no disadvantage that the minute-particle red iron oxide pigments cohere and alkalinity of the minute-particle red iron oxide pigment slurry is increased.

According to the red-filter forming method of the present invention, the mixed solution of PVA and ADC is coated on the entire surface of the panel on which the black matrix is previously formed in a predetermined pattern. The portion of the panel where the green and blue phosphors are to be formed is exposed to ultra-violet rays through the shadow mask or the aperture grill to form the PVA film thereon. The minute-particle iron oxide red pigment slurry made by adding sodium silicate to the minute-particle red iron oxide pigment slurry is coated on the entire surface of the panel and then dried. Bridge bonds of the PVA film at the portion where the green and blue phosphors are to be formed are broken by a treating agent. Then, the panel is developed by using water and the red filter is formed on the portion of the panel where the red phosphor is to be formed, and on the black matrix. Therefore, it is possible to obtain the red filter which hardly discolors the black matrix.

Having described preferred an embodiment of the present invention with reference to the accompanying drawings, it is to be understood that the present invention is not limited to the above-mentioned embodiments and that various changes and modifications can be effected therein by one skilled in the art without departing from the spirit or scope of the novel concepts of the present invention as defined in the appended claims.

What is claimed is:

1. A method of forming a red filter comprising:

a step of coating a mixed solution of polyvinyl and ammonium dichromate on an entire surface of a panel where a black matrix is previously formed in a predetermined pattern;

a step of forming a poly(vinyl alcohol) film by exposing a portion of said panel where a green phosphor and a blue phosphor are to be formed to ultra-violet rays through a shadow mask or an aperture grill;

a step of coating a minute-particle iron oxide red pigment slurry obtained by adding sodium silicate to a needle-shaped minute-particle iron oxide red pigment dispersed slurry on an entire surface of said panel and then drying the same;

a step of breaking, by a treating agent, a bridge bond of the poly(vinyl alcohol) film at a portion where said green phosphor and said blue phosphor are to be formed, and carrying out development with water; and a step of forming a red filter on the portion where a red phosphor is to be formed, and on said black matrix.

2. A method of forming a red filter according to claim 1, wherein said sodium silicate is sodium silicate No. 3.

3. A method of forming a red filter according to claim 2, wherein said sodium silicate No. 3 is added in an amount of from about 1% to about 30% by weight relative to iron oxide pigment.

4. A method of forming a red filter according to claim 1, wherein a mean particle size of said slurry is less than or equal to 0.1 µm.

5. A method of forming a red filter according to claim 1, wherein said development with water is such that a mixed solution of PVA and ADC is coated on the panel and exposed to ultra-violet rays and then the panel is developed by using water.

6. A method of forming a red filter according to claim 1, further comprising a step of adjusting a coating of a slurry obtained by dispersing said iron oxide red pigment and a dispersion agent in water by rotation of the slurry.

7. A method of forming a red filter according to claim 1, wherein silica ($SiO_2$) is formed on a boundary surface between said iron oxide and a carbon black by hydrolyzing said sodium silicate.

8. A method of forming a red filter according to claim 1, wherein a major axis of the particle size of said needle-shaped iron oxide red pigment in said slurry is set within the range of from about 0.05 to about 0.1 µm and a minor axis thereof is set at about 0.01 µm.

* * * * *